(No Model.) 6 Sheets—Sheet 1.
J. B. CLINE.
MACHINE FOR APPLYING BARBS TO FENCE WIRES.
No. 279,339. Patented June 12, 1883.

Fig. 1.

Attest,
W. H. H. Knight
Newton Wyckoff

Inventor.
J. B. Cline.
By his attorney
Philip T. Dodge.

(No Model.) 6 Sheets—Sheet 2.

J. B. CLINE.
MACHINE FOR APPLYING BARBS TO FENCE WIRES.

No. 279,339. Patented June 12, 1883.

(No Model.) 6 Sheets—Sheet 3.
J. B. CLINE.
MACHINE FOR APPLYING BARBS TO FENCE WIRES.
No. 279,339. Patented June 12, 1883.

Attest
W. H. H. Knight
Newton Wyckoff

Inventor,
J. B. Cline
By his Attorney
Philip T. Dodge

(No Model.) 6 Sheets—Sheet 4.

J. B. CLINE.
MACHINE FOR APPLYING BARBS TO FENCE WIRES.

No. 279,339. Patented June 12, 1883.

Attest,
W. H. H. Knight
Newton Wyckoff

Inventor,
J. B. Cline,
By his Attorney
Philip T. Dodge.

(No Model.)  6 Sheets—Sheet 6.

J. B. CLINE.
MACHINE FOR APPLYING BARBS TO FENCE WIRES.

No. 279,339.  Patented June 12, 1883.

Attest,
W. H. H. Knight
Newton Wyckoff

Inventor,
J. B. Cline
By his Attorney
Philip T. Dodge

UNITED STATES PATENT OFFICE.

JOHN B. CLINE, OF JEFFERSON, IOWA, ASSIGNOR OF ONE-HALF TO FRANK THOMPSON, JAMES E. CLINE, OLIVER R. GRAY, AND EUGENE F. BILLINGS.

MACHINE FOR APPLYING BARBS TO FENCE-WIRES.

SPECIFICATION forming part of Letters Patent No. 279,339, dated June 12, 1883.

Application filed April 3, 1883. (No model.)

*To all whom it may concern:*

Be it known that I, JOHN B. CLINE, of Jefferson, in the county of Greene and State of Iowa, have invented certain Improvements in Machines for Applying Barbs to Fence-Wires, of which the following is a specification.

This invention relates to a machine for manufacturing that class of barb fence-wires which consists of two or more wires or strands twisted together or not, as preferred, to form a cable, and provided at regular intervals with barbs consisting of short-pointed sections of wire applied transversely to the strands and wound at the middle firmly thereon. In my improved machine the two or more main wires or strands are passed lengthwise through a hollow intermittingly-rotating mandrel. Feed-rolls properly geared cause the strands to advance intermittingly. At the forward end the mandrel is provided with a radially-slotted head designed to coil the barbs around the strands or wires. Feed mechanism provided for the purpose causes the ends of the wires passing from reels to be projected transversely through the slots in the coiling-head across each other and across the main wires. Clamping-jaws operate automatically to engage and hold the inner ends of these crossed barb-wires, and automatically-shearing devices sever said wires at suitable points and produce barbs of the required length. After the severance of these barbs, while they still extend across the main wires and while clamped at their inner ends, the coiling-head revolves, causing them to be wrapped or wound around the main wires. After this operation the clamping-jaws release the barbs, the main wires are caused to advance endwise, and the operation repeated.

The invention consists in the various mechanisms and combinations of mechanisms for effecting the above operation, as will be hereinafter described in detail.

Referring to the accompanying drawings, Fig. 6$^a$ is a perspective view of the facing of one of the clamping-jaws detached.

Figure 9:
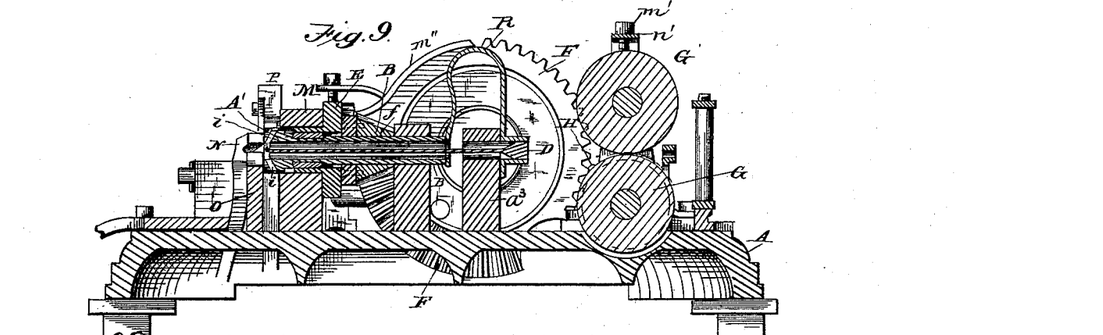
Fig. 9 is a vertical longitudinal section through the center of the machine, on the line $x\,x$, Fig. 1.
Figure 10:
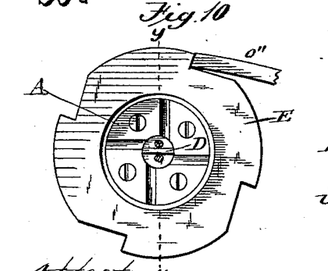
Fig. 10 is a front view of the coiling-head and its immediate connections.
Figure 11:
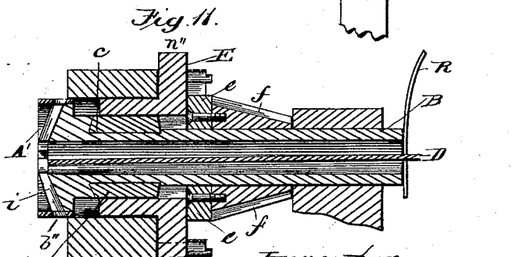
Fig. 11 is a longitudinal section on the line $y\,y$, on an enlarged scale.

Referring to the drawings, A represents a stationary bed-plate designed to give support to the principal operative parts of the machine, which are mounted thereon. In this bed-plate I mount in suitable bearings a horizontal tubular revolving arbor or shaft, B, through which the main wires C are passed lengthwise, as shown, this arbor being sustained in such manner that it may also receive a limited longitudinal motion in its bearings, as hereinafter explained. For the purpose of separating the wires from each other and preventing their rotation within the arbor, a stationary plate, D, is extended lengthwise through the center of the arbor and secured firmly at one end to a post or support, $a^3$, on the frame, as represented in Figs. 9 and 11. The arbor receives an intermittent rotary motion in one direction by means which I will now describe.

Figure 12:
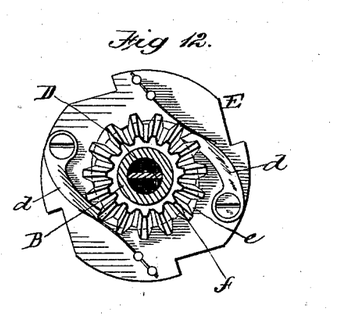
Fig. 12 is a rear view illustrating the coiling-head and the connections for actuating the same.

As shown in Fig. 11, the forward end of the arbor passes through an encircling wheel or disk, E, with which it is connected by longitudinal splines $e$, which admit of the arbor being moved lengthwise. The wheel E is provided, as shown in Fig. 12, on its rear side with pivoted pawls d, arranged to engage with corresponding ratchet-teeth formed upon a wheel, e, secured to a bevel-pinion, f, which loosely encircles the arbor. This connection permits the pinion f to revolve in one direction loosely upon the arbor, but causes it, when revolved in the opposite direction, to impart motion through the pawls and ratchet-wheel to the arbor. The bevel-pinion f receives an intermitting rotary motion from corresponding bevel-teeth extending partially around the periphery of the wheel F, mounted on a horizontal axis. This wheel receives an intermittent rotary motion in opposite directions, as will be hereinafter explained, and, by means of connections above described, it consequently imparts to the tubular arbor an intermittent rotary motion always in the one direction, as above referred to.

Figure 17:
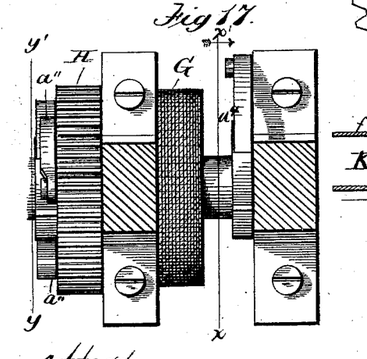
Fig. 17 is a top plan view of the ratchet mechanism for imparting motion to the feed-rolls.
Figure 18:
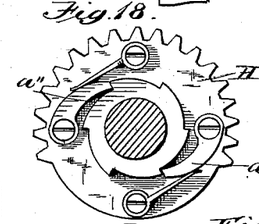
Fig. 18 is a section on the line $y'\,y'$ of the above figure.

For the purpose of feeding the main wires C forward through the arbor with an intermitting motion, I locate in rear of the arbor a pair of horizontal feed-rolls, G G', between which the wires pass, and thence to the arbor. The lower roll, G, is provided at one end with a loose spur-pinion, H, having a pawl-and-ratchet connection, a'', therewith, as represented in the drawings, Figs. 17, 18. The spur-wheel H is arranged to engage with and receive motion from corresponding spur-teeth formed on the edge of the before-mentioned wheel F, this wheel having, as will be observed, the bevel-teeth upon one portion of its periphery, and the spur-teeth upon the other. The arrangement of the ratchet mechanism for rotating the arbor and that for rotating the feed-rolls is such that when the wheel F is turned in one direction it will impart a rotary motion to the arbor and permit the feed-rolls to remain at rest, and that when revolved in the opposite direction it will permit the arbor to remain at rest and revolve the feed-rolls, causing the wires to be advanced through the stationary arbor. The reverse rotation of the feed-rolls is prevented by a pawl and ratchet, $a^4$, as clearly represented in Figs. 1, 17, and 19.

Figure 13:
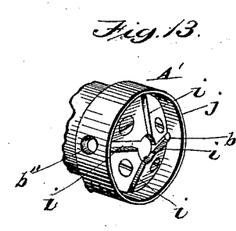
Fig. 13 is a perspective view of the coiling-head.

Passing now to the means for applying the barbs, the forward end of the rotary arbor is provided with a coiling-head, A', such as represented in Fig. 13, which revolves therewith. This head has the central opening, through which the extended ends of the main wires emerge from the arbor, and is provided in its front face with four radial or substantially radial grooves, i, to receive the barb-wires I and admit of their being projected transversely across or between the main wires, as shown. The coiling-head is encircled by a peripheral flange, J, provided with holes or openings b'', coincident with the outer ends of the grooves i. These holes are designed to receive and guide the ends of the barb-wires, and to retain the same in position during the operation of coiling them about the main wires and until the twisting operation is completed. The grooves or slots i, through which the barb-wires are introduced, have an inclination forward in the direction of the axis of the arbor from the outer edge toward the center, for the purpose of causing the two barb-wires which enter from opposite sides to pass obliquely across each other and across the main wires, instead of lying, as they would otherwise do, parallel with each other and at right angles to the main wires. This introduction of the barb-wires at a forward inclination also causes their inner ends to be projected in front of the face of the head in such manner that they may be held by the gripping or clamping jaws hereinafter explained. This construction of the grooves and the manner in which the barb-wires are introduced at different angles are plainly represented in Fig. 1, the course of the wire being indicated in the figure by dotted lines. As represented in the drawings, the grooves i in the face of the coiling-head are made of a depth greater than half the diameter of the wires, so that there will be no tendency on the part of the wires to ride out of the grooves while the head is in motion. As a result of this construction, I am enabled to operate the machine without the employment of movable jaws or devices to retain the wires within the grooves of the coiling-head. The barb-wires are coiled upon two rolls, K, mounted one upon each side of the machine, as represented in the figures. From these rolls the wires pass between feed-rolls L, which will be presently described, and thence through holes or guides formed in a stationary head-block, M, this stationary head-block serving to guide the ends of the barb-wires with certainty and accuracy into the peripheral openings of the coiling-head during the time that the latter is at rest.

Figure 16:
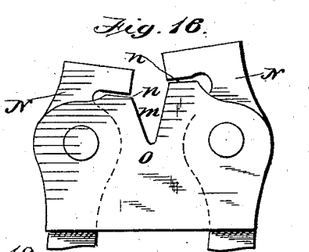
Fig. 16 is a view of the anvil against which the clamping-jaws act to hold the barb-wires.

The feeding of the respective barb-wires inward at the proper times and to the proper extent is accomplished by means of the two pairs of feed-rolls L, before referred to. These rolls are mounted on horizontal shafts or bearings, one pair at each side of the machine, and are made adjustable as to pressure and driven intermittingly by means which will be hereinafter detailed. After the barb-wires have been projected inward across the main wires, it is necessary that the portion to form the barb shall be severed from the main wire, and that each of these severed portions shall be firmly held at one end while the opposite end is being coiled around the main wires by the rotation of the coiling-head. For the purpose of retaining the ends of said wires I employ two pivoted clamping or gripping jaws, N, pivoted to and arranged to co-operate with a stationary anvil, O, as plainly represented in Figs. 1, 3, 16. The anvil-block O is provided with a central groove, m, to permit the passage of the main wires through the same, and with shoulders or bearing-faces n, upon which the ends of the barb-wires are clamped by the jaws N. The clamping jaws or levers N are preferably sustained upon horizontal pivots passed through the anvil-block, as shown. The clamping-jaws are adapted to act upon the upper surfaces of the anvil by having their upper ends or jaws proper projected laterally to engage over the anvil, as shown in Figs. 9 and 16. The jaws or grippers are caused to act intermittingly by means which will be hereinafter explained. The active ends of the jaws or grippers and the anvils with which they co-operate are arranged immediately in front of the coiling-head in such position as to grip the wires at a point within the line of its periphery, as shown.

Referring next to the means for effecting the severance of the respective barb-wires, the same will be found to consist of two pivoted cutting-levers, P, mounted on horizontal pivots in front of the clamping-jaws, each having a blade arranged to co-operate with a corresponding stationary blade, Q, secured in the face of the stationary head-block M, before referred to. Each of the levers P has its cutting-blade, $p$, secured therein by means of a set-screw, $q'$, or equivalent device, which will admit of its adjustment or removal at will. The stationary cutting-blades Q are seated in grooves in the face of the fixed head-block, and secured by means of screws, as shown, or other suitable devices which will admit of their being also adjusted and removed at will. The cutters swing in planes at right angles or substantially right angles to the axis of the main wires, in a direction oblique to that in which the barb-wires are extended, so that in acting upon said barb-wires they shear or sever the same obliquely, thus producing sharp points upon the barb-sections.

The operation of the parts above enumerated is as follows: The main wires are extended through the arbor and the head, as before described. The arbor standing at rest, the feed-rolls G and G' cause the main wires to be advanced a suitable distance, after which the rolls cease their motion. The barb-feeding rolls L are operated at the same time and caused to project the barb-wires inward through the peripheral openings and the radial slots in the coiling-head until said wires cross the main wires and each other, and until their inner ends are brought over the faces of the anvils O, whereupon the feed-rolls L cease their motion. The clamping-jaws or grippers N then descend and hold the inner ends of the barb-wires firmly in place upon the anvils. The cutting-levers P next swing downward at their upper ends and effect the severance of the barb-wires, removing from the inner end of each a piece of sufficient length to form a single barb. At this point in the operation the severed barb-sections lie across the main wires and across each other in the grooves of the coiling-head, their outer ends projecting from the peripheral openings of the head, and their inner ends being held rigidly by the clamping devices, the other parts being at rest. The coiling-head now commences its rotation around the main wires, which remain at rest, carrying with it the outer ends of the barb-wires, which are thus firmly coiled about the main wires. By the coiling operation the barb-wires are reduced in length and their outer ends gradually drawn inward, until finally they are drawn through the peripheral openings of the head into the slots, whereupon the rotation of the coiling-head ceases. The outer ends of the completed barbs are now free, so that they may be carried forward with the main wires, which are immediately caused to advance, by the action of the feed-rolls G G', a sufficient distance to permit the application of the succeeding barb, after which the operations above described are again repeated.

Inasmuch as the barbs are held firmly at one end during the coiling operation, they are wound backward upon the main wire, and, if no provision were made to the contrary, would crowd or bind against the face of the coiling-head. It is to guard against this contingency that the longitudinal motion of the coiling-head and the arbor before referred to are permitted. A strong spring, R, secured to the frame and bearing against the rear end of the arbor, as shown in Figs. 9 and 11, urges the same with its coiling-head forward. The yielding of the spring permits the head to move gradually backward under the pressure of the wire coiled against its front face.

Figure 1:
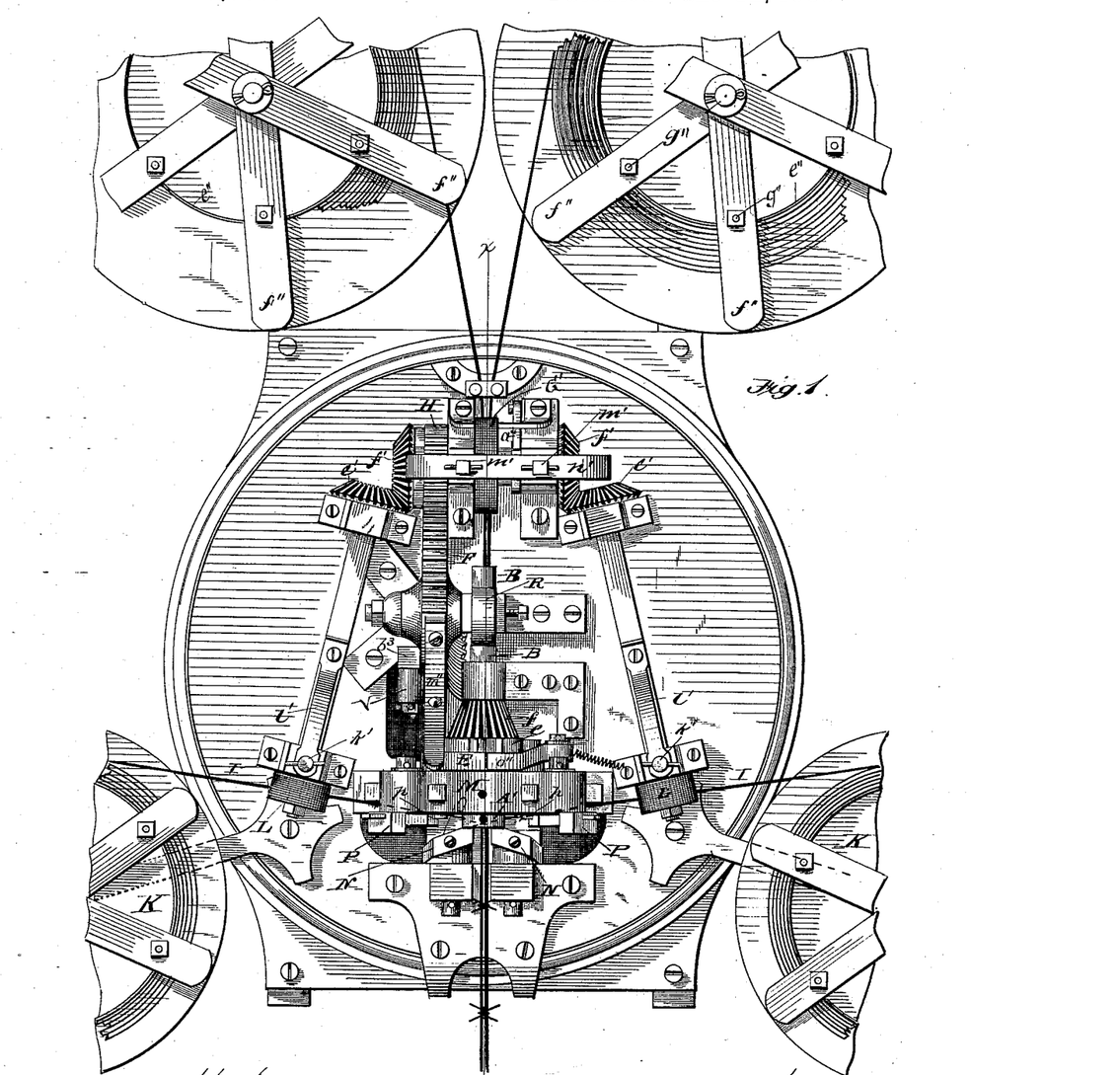
Figure 1 represents a top plan view of my improved machine.
Figure 2:
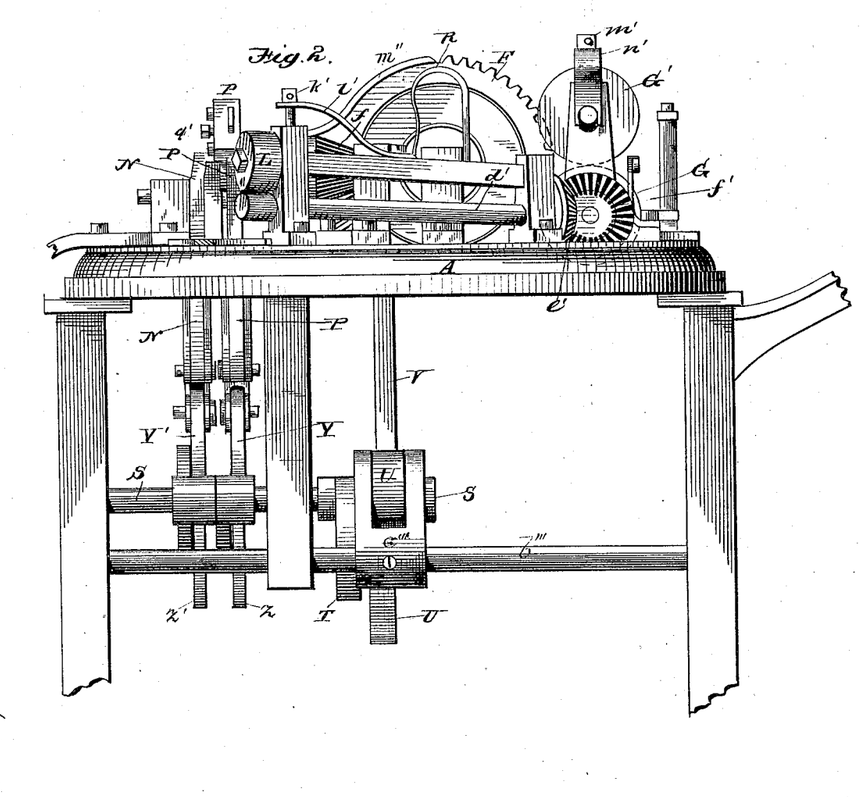
Fig. 2 is a side elevation of the same.
Figure 3:
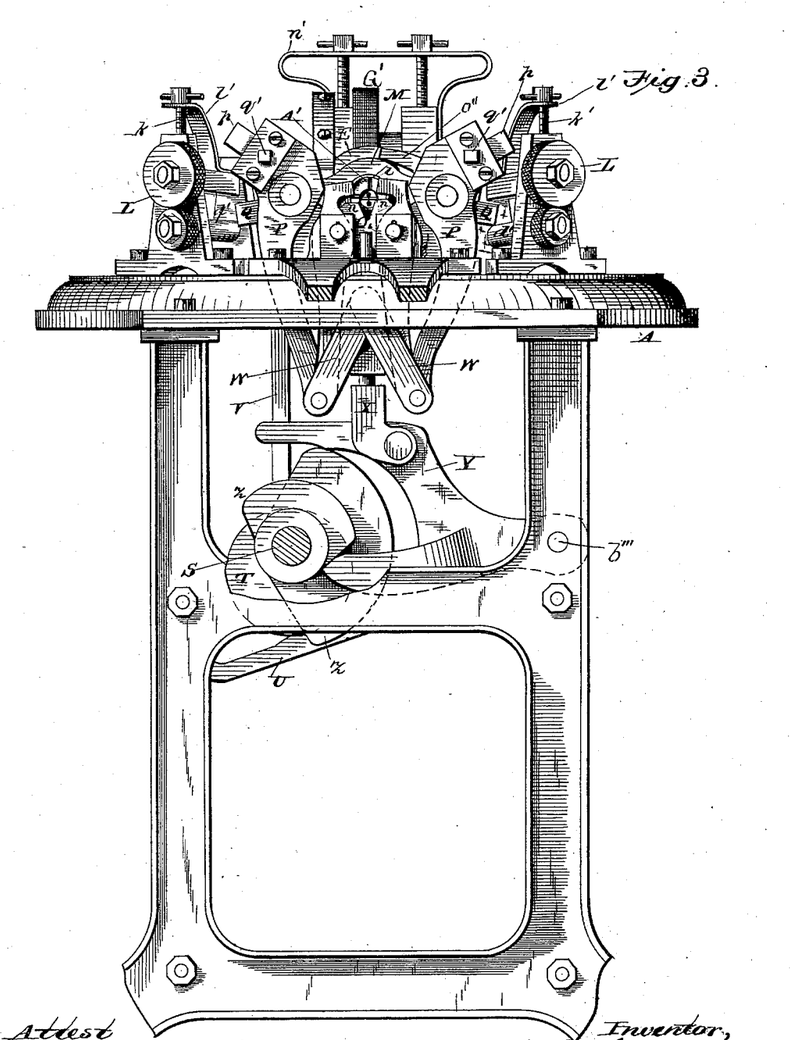
Fig. 3 is a front elevation of the same.
Figure 8:
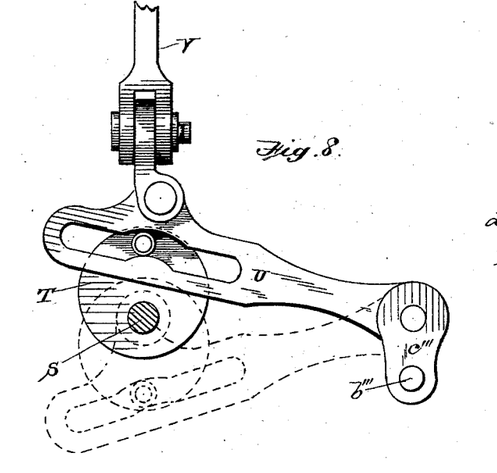
Fig. 8 is a detailed view of the crank-connection for operating the rolls by which the main wires are fed endwise.

Passing now to the details of the mechanism by which the motion is imparted to the devices above described, it will be seen on reference to Figs. 2 and 3 that a driving-shaft, S, is mounted in fixed bearings beneath the bed-plate. At one end this shaft is provided with a crank or crank-wheel, T, arranged to act in a sinuous slot in one end of a vibratory arm, U, pivoted to an arm, $c'''$, on rod $b'''$, as plainly represented in Fig. 8. The arm U is connected by an intermediate swiveling joint with a pitman, V, the upper end of which is in turn connected by a universal joint or swiveling connection with the gear-wheel F, before alluded to. This connection consists, as shown in Fig. 1, of a block, $b^3$, having at right angles to each other two journals or wrists, one of which passes through the upper end of the pitman, while the other passes, as shown in dotted lines, through the wheel F. The rotation of the crank-shaft causes a reciprocating motion to be imparted through the pitman V to the wheel F, giving the latter a partial rotation first in one direction and then in another, whereby it is caused to impart a rotary motion to the feed-rolls G and G' and to the coiling-head, as before explained. The curvature of the slot in the lever U is such that during the time the lever is in its uppermost position it is permitted to remain for a short period of time at rest, the result being that the coiling-head is permitted to rest and hold the main wires stationary during the operation of gripping and severing the barb-wires.

Figure 4:
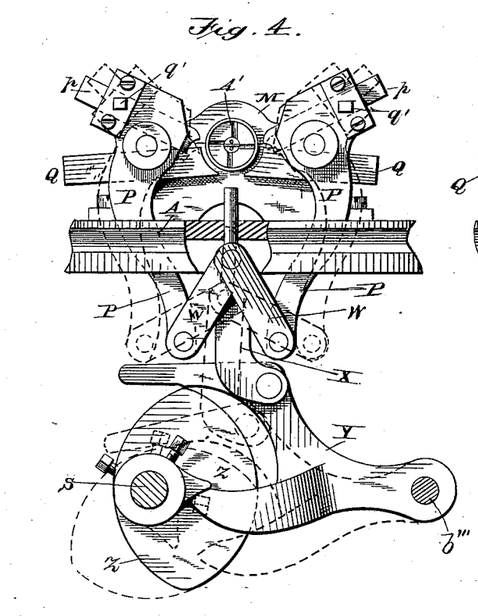
Fig. 4 is a front elevation, on an enlarged scale, illustrating the form and relative arrangement of the cutting and coiling devices.
Figure 5:
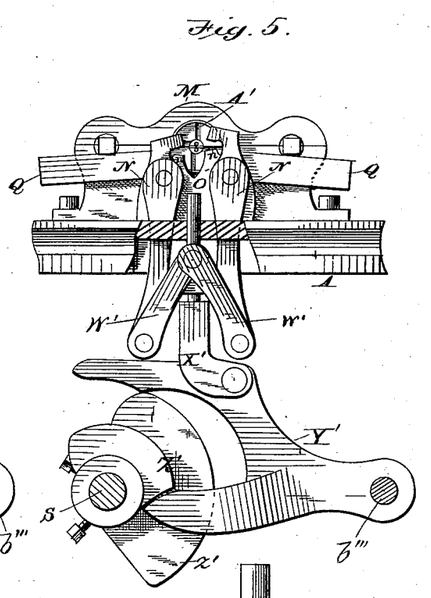
Fig. 5 is a similar view of the clamping and twisting mechanism.

For the purpose of imparting motion to the cutting-levers P, I connect their lower ends, as shown in Fig. 4, by means of two links, W, which are in turn connected at their adjoining ends by means of a reciprocating rod, X, to a forked lever, Y, mounted on rod $b'''$ and acted upon by a double cam, Z, on the main shaft. The rotation of the cam causes the lever Y to move upward, lifting the inner ends of the links W and causing them to actuate the levers P in such manner as to throw the knives backward out of action. At the proper time, however, the cam, acting upon the lower end of the lever Y, depresses said lever, causing the links W to assume the position indicated by dotted lines in Fig. 4, and thereby cause the operation of the cutters. To insure a proper action of the rod X upon the links W, the upper end of the rod is preferably guided by passing it through an opening in the bedplate, as shown in Fig. 4.

Figure 7:
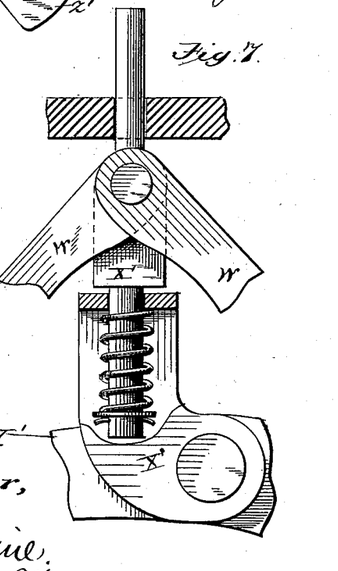
Fig. 7 is a view of a portion of the mechanism by which the gripping-jaws are actuated, showing the relief-spring combined therewith.

Passing next to the devices for operating the clamping-jaws N, it will be seen that the lower ends of the cam and levers are connected by links to a reciprocating rod, X', and to a lever, Y', mounted on rod $b'''$, and actuated by a double cam, Z', on the main shaft, the general construction being similar to that for operating the cutters, the form of the cams being, however, modified as required. In order that the jaws may act with a yielding pressure upon the wire, so as to confine the same firmly without danger of its being crushed, I interpose, as shown in Fig. 7, between lever Y' and the rod X' a spiral compression-spring, forming a connection between the two, as plainly represented. This spring, yielding in the event of an excessive strain being applied, prevents the jaws from acting with dangerous pressure. The double cams and the crank upon the main shaft are so adjusted with respect to each other as to cause the operation of the various parts in the order hereinbefore recited.

Figure 14:
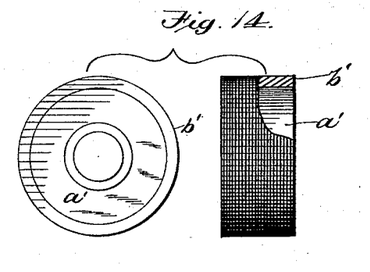
Fig. 14 is a side and edge view of one of the wire-feeding rolls.

In order to insure the firm engagement of the feed-rolls with the wire, I prefer to construct them in the manner represented in Fig. 14, each roll consisting of a central hub or body, $a'$, and of a peripheral band or ring of soft steel, $b'$, shrunk or otherwise firmly secured thereon, the band being provided with a series of fine circumferential grooves, as shown. This construction is also advantageous in that it admits of the wearing-surfaces being removed and renewed when worn.

The lower feed-rolls, L, by which the barbwires are advanced, are mounted upon horizontal shafts $d'$, the rear ends of which are provided with bevel-pinions $e'$, driven by corresponding pinions, $f'$, applied to the shaft of the main feed-roll G, as shown in Figs. 1 and 2, whereby the various feed-rolls are caused to move in unison, and thus advance the main and barb wires simultaneously. The upper rolls, L, for feeding the barb-wire are mounted on vertically-swinging arms subjected to the pressure of screws $k'$ acting on springs $l'$, whereby the roll may be adjusted to act with any required degree of pressure upon the wire. The main feed-roll G' is in like manner depressed by means of screws $m'$ passing through a supporting-spring, $n'$, and acting upon the bearings of the rolls.

Figure 6:
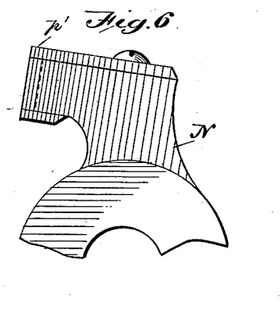
Fig. 6 is an enlarged view of one of the clamping or gripping jaws.
Figure 6A:
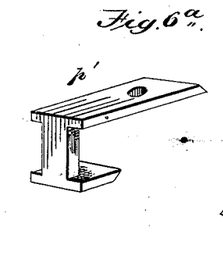

To insure a firm hold of the clamping-jaws upon the wire, I prefer to arm each jaw with a soft-steel facing, $p'$, as shown in Figs. 6 and 6ª, secured by a screw and removable at will.

Figure 15:
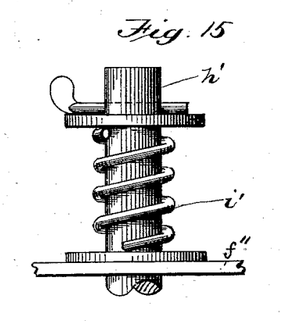
Fig. 15 is a view illustrating the application of the tension-spring to the wire-rolls.
Figures 19, 20:
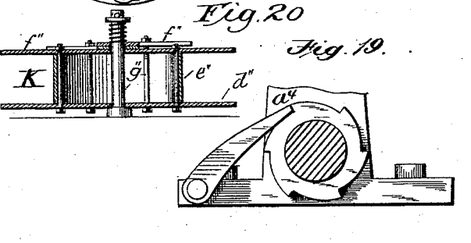
Fig. 19 is a section on the line $x'\,x'$.
Fig. 20 is a vertical central section through one of the wire-reels.

The reels upon which the wire is wound are each constructed in the manner represented in Figs. 1 and 20. A circular plate or disk, $d'$, forms the base of the reel and gives support to a cylindrical hoop or barrel, $e'$, of smaller diameter, seated thereon. The hoop in turn gives support at its upper edge to a series of elastic transverse arms or bars, $f''$. Vertical bolts $g''$, passed at their ends through the bottom plate and the arms at the top, serve to hold said parts snugly against the edges of the hoop or barrel and also to retain the latter in proper position. A central bolt, $h'$, serves as a pivot or journal upon which the roll revolves. As shown in Fig. 15, the end of this journal projects above the surface of the reel, and is provided with a spiral spring, $i'$, bearing at its lower end on top of the reel and at its upper end beneath a collar applied to the upper end of the reel-spindle. The spring thus applied, acting jointly with the elasticity of the arms $f''$, serves to produce sufficient friction to give the required tension to the wire. The construction of the reels in the particular manner described is advantageous on account of its simplicity and cheapness, of the fact that it exposes the wire to view in such manner that the operator may readily perceive in advance the fact that the supply is nearly exhausted, and of the facility which it affords for securing the end of the wire.

Referring again to the stationary dividing-strip employed as within the rotary arbor to separate the main wires, attention is directed to the fact that the rear fixed end of this strip is twisted or given a quarter-turn about its axis. As the two main wires emerge from the feeding-rolls G and G' they lie side by side in the same horizontal plane; but by reason of the twist in the end of the dividing-strip just described the position of the wires is changed, so that they lie one above the other in passing through the arbor, this changed position of the wires facilitating the application of the barbs thereto.

Referring again to the coiling-head and its action in winding the barbs upon the main wire, it is found in practice that the barbs, after being coiled, have a slight tendency, owing to the elasticity of the wire, to react or unwind from the main wire. To avoid the loosening of the barbs by this action, we find it desirable to give the coiling-head a slightly-increased rotation, so as to carry the points slightly beyond the point at which they are expected to stand, in order that they may react to the proper point. This additional forward rotation of the head is secured by applying to the main driving-wheel F an eccentric arm or projection, $m''$, as plainly represented in Figs. 1, 2, and 9. This arm, acting upon the ratchet-wheel applied to the arbor which carries the twister-head, serves to turn said wheel and thereby the twister-head slightly beyond the position to which it would be carried by the gear. The reactionary motion of the coiling-head is limited and the head stopped at the proper point by means of a pawl, $o''$, engaging with a ratchet-wheel, $e$, secured to the arbor, as represented in Figs. 1, 9, 10, 11, and 12.

The present invention is restricted to those matters and things which are hereinafter claimed, and as to all matters which may be described or shown, but which are not claimed, the right is reserved to make the same the subject-matter of a separate application.

Having thus described my invention, what I claim is—

1. The improved coiling-head for a wire-barbing machine, provided with a central perforation, the facial grooves, and the peripheral flange having holes therein.

2. The coiling-head for a wire-barbing machine, provided with a central passage for the main wires and with radial or substantially radial grooves for the passage of the barb-wires, said grooves having a forward inclination toward the center of the head and a depth greater than half the diameter of the wire, whereby they are adapted to retain the wire therein without the employment of anvils or pressure devices.

3. In a wire-barbing machine, the combination of the rotary coiling-head movable in the direction of its axis, and provided in its front face with open grooves to a depth greater than half the diameter of the wire, to receive the barb-wire, with the spring to urge the same forward, as described, whereby the head is permitted to recede as the barb-wires are wound against its face, but maintained in engagement with said wires without the employment of anvils or supporting devices to hold the wires therein.

4. In combination with the twister-head having the forwardly-inclined grooves for the reception of the barb-wires to a depth greater than half the diameter of said wires, clamping-jaws N, and co-operating anvils adapted to retain the ends of said barb-wires in advance of the twister-head, substantially as shown.

5. In combination with the rotary coiling-head having the grooved face, as described, the clamping devices adapted to engage the inner ends of the barb-wires forward of the coiling-head, and the cutting devices, independent of the coiling-head, adapted to sever the barb-wires at a point beyond the periphery of the head.

6. The rotary coiling-head movable in the direction of its axis, and provided with grooves in its forward face to a depth greater than half the diameter of said wires, combined with the spring to urge the same forward, and with the two cutting devices and the two clamping devices acting independently of the head, as described, whereby two barbs may be severed, clamped, and coiled simultaneously.

7. The rotary twister-head and the pinion-and-ratchet connection for driving the same, combined with a driving-wheel, F, having a rotary reciprocation, whereby the twister-head is given an intermitting rotation in one direction.

8. The combination, of the twister-head, the pinion-and-ratchet connection for driving the same, the wire-feeding rolls, and a pinion-and-ratchet connection for imparting motion thereto, and a driving-wheel engaging with the twister-driving pinion and also with the roll-driving pinion, substantially as described, whereby said driving-wheel is caused to impart motion to the twister and the feeding devices alternately.

9. In combination with the driving-wheel F, having a rotary reciprocation, the feed-rolls G and G′, the former connected with the wheel F through the medium of a pinion-and-ratchet connection, as described and shown.

10. In combination with the rolls G G′, for feeding the main wires, the beveled pinions $f'$, the beveled pinions $e'$, engaging in the first-named pinions, and the rolls L, for feeding the barb-wire, one of each set being applied direct to the shaft of the corresponding pinion, $e'$.

11. In a wire-barbing machine, the combination, with the wheel F, arranged to operate the wire feeding and twisting devices, as described, a pitman, V, crank T, and lever U, provided with a sinuous slot, whereby the feed mechanism is permitted to rest during the barbing operation.

12. The combination of the two clamping-levers, co-operating anvils, the links connecting their lower ends, a forked lever connected with said links, and the double cam applied to the main shaft, and constructed, substantially as described, to impart motion to said lever.

13. In combination with the clamping-levers, co-operating-anvils, the operating-links, the lever for operating said links, and the cam for operating said lever, the intermediate spring-connection, whereby a yielding pressure of the clamping-levers is obtained.

14. The main feed-rolls G G′ and the pinions on the end of the former, combined with the barb-feeding rolls, their shafts, and the pinions on one shaft of each set of barb-rolls in engagement with the corresponding pinion of the main roll, combined with the coiling-head and with automatic mechanism, substantially as described, whereby motion is imparted to the coiling-head on one hand, and to the main feeding-rolls and barb-feeding-rolls on the other hand, alternately.

15. In combination with the coiling-head

A', having the open grooves $i$ in its front face, as described, the stationary head-block M, provided in opposite sides with holes or openings coincident with the grooves in the coiling-head, whereby the two barb-wires are guided into said grooves across each other and across the main wires.

16. The clamping-jaw N, provided with the removable facing $p'$, extending from its under surface upward upon the upper surface, in the form substantially as described and shown.

17. In a wire-barbing machine, the wire-reel consisting of a bottom plate, a hoop or barrel seated thereon, a series of elastic arms applied to the opposite end of the barrel, and connecting-bolts extending through the interior of the barrel and connecting the disk and arms, as described.

18. In a wire-barbing machine, a feed-roll consisting of a body portion, $a'$, and the soft-metal ring $b'$, applied to the periphery of the body, and provided with serrations in its surface, as described, whereby the surface is adapted to engage firmly upon the wire.

19. In a wire-barbing machine, wire-feeding rolls having their periphery composed of soft metal provided with fine peripheral grooves therein, whereby said rolls are caused to engage firmly with the wire.

20. In combination with the twister-head and tubular rotating arbor, the stationary dividing-strip, located longitudinally within the arbor and having its rear end twisted in the manner substantially as described and shown.

21. In combination with the twister-operating pinion and the ratchet-wheel, also connected with the twister, the operating-wheel E, provided with teeth to engage the pinion, and with an arm or projection, $m''$, to impart an additional rotation to the twister-head.

JOHN B. CLINE.

Witnesses:
PHILIP T. DODGE,
HARRY SHIPLEY.